May 22, 1923.
J. BAUER
STORM SHIELD
Filed July 24, 1920
1,455,829
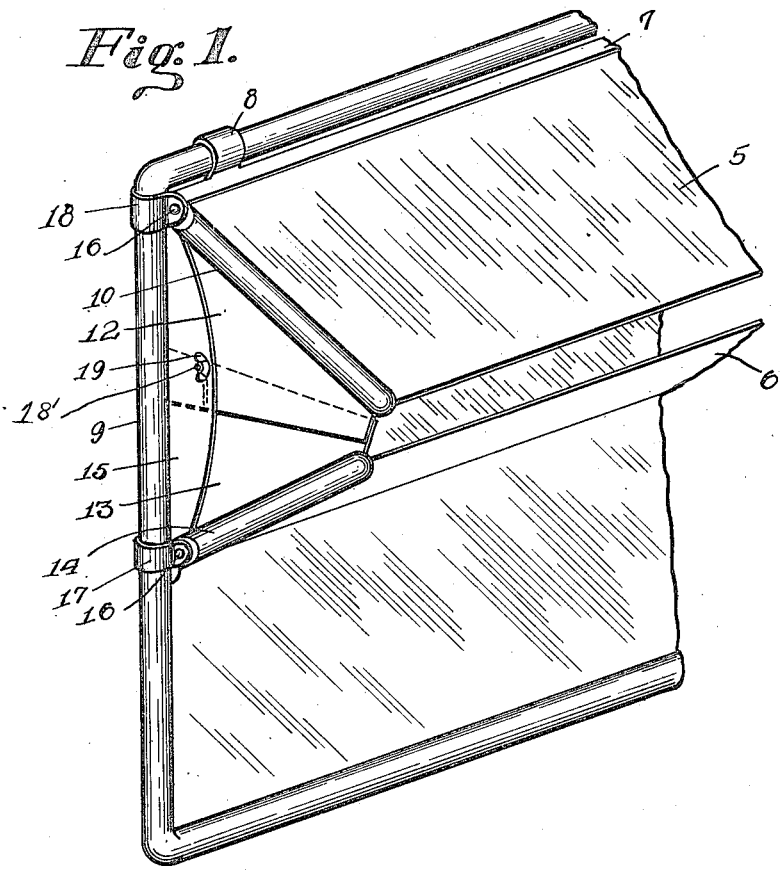
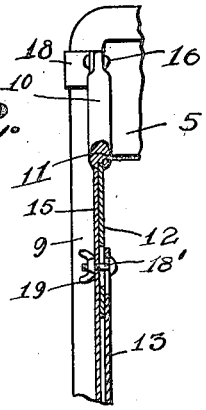
Inventor
J. Bauer:
Witness Patented May 22, 1923.

1,455,829

UNITED STATES PATENT OFFICE.

JOHN BAUER, OF DETROIT, MICHIGAN.

STORM SHIELD.

Application filed July 24, 1920. Serial No. 398,801.

*To all whom it may concern:*

Be it known that I, JOHN BAUER, a citizen of the United States, residing at Detroit, in the county of Wayne and State of Michigan, have invented a new and useful Storm Shield (Case A), of which the following is a specification.

This invention has reference to improvements in storm shields, and more particularly to a shield especially designed for use in connection with the wind shields of motor vehicles for preventing rain moisture or the like from collecting on the wind shield to obstruct the line of vision of the operator of the motor vehicle.

An object of the invention is to provide a device of this character which may be readily and easily applied to the wind shield of a motor vehicle, eliminating the necessity of altering the construction of the wind shield, to accomplish the positioning of the storm shield, forming the subject matter of this invention.

A further object of the invention is to provide means of this character including a pair of opposed shields, of a construction to permit of adjustment of the shield with relation to each other to permit the device to efficiently accomplish its purpose under various weather conditions.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a fragmental perspective view of a wind shield disclosing the invention as applied.

Figure 2 illustrates a detail sectional view of one corner of a shield having the invention applied thereto.

Referring to the drawings in detail, the reference character 5 designates the upper section of the shield which may be formed of glass or other transparent material, the lower section 6 of the shield being formed of any suitable light material.

Each of the sections is supported in a frame which includes a bar 7 of a length approximately the length of the wind shield to which the auxiliary shield is to be applied, the same being formed with hooked members indicated at 8 and which are disposed at opposite ends of the bar 7 and are of constructions to permit the same to be readily and easily positioned over the usual frame 9 of the wind shields now in use.

The frame also includes opposed end members indicated at 10, each of which is preferably circular in cross section and is provided with grooves indicated at 11 formed in opposite surfaces of the end members, one of which grooves is designed to receive the material of which the upper section 5 is formed so that the upper section may be secured to the end members 10 in a manner to prevent displacement thereof.

The opposite groove, which is formed in the lower surface of each of the end members accommodates the upper section 12 at the ends of the shield, the upper section being shown as overlapping the lower section 13, which is also positioned in a groove formed in the upper surface of the end member 14 in the lower section, there being provided a groove in one of the side surfaces of the end member 14 to accommodate the lower section 6 of the shield to secure the lower section thereto.

A securing member indicated by the reference character 15 extends forwardly from the wind shield and has pivotal connection with the end members 12 and 13, through the medium of the pivot pins 16 which provide means for connecting the end members to their supporting hooks 17 and 18, whereby the wind shield is further secured against movement.

This securing member 15 is provided with a suitable opening to accommodate the bolt 18′ which accommodates the winged nut 19, the bolt 18′ however operating in suitable elongated openings provided in the end members 12 and 13, to permit the end members to be adjusted with relation to each other and secured in such positions of adjustment to regulate the distance between the outer extremities of the upper and lower sections of the auxiliary shield.

From the foregoing it is obvious that due to the adjustment between the upper and lower sections 5 and 6, a suitable space is provided between the outer ends of the upper and lower sections to permit the operator to have a clear line of vision through the wind shield, between the sections.

Having thus described the invention, what is claimed as new is:—

In combination with a wind shield, an auxiliary storm shield including opposed transparent sections, end members secured to the sections, end guarding sections having connection with the end members and adapted to overlap each other to permit of adjustment of the transparent sections, a securing plate having connection with the end members and overlapping the end guarding sections, means contacting with the end guarding sections for supporting the transparent sections in their positions of adjustment, and hook members on the sections to support the shield.

In testimony that I claim the foregoing as my own, I have hereto affixed my signature in the presence of two witnesses.

JOHN BAUER.

Witnesses:
E. A. PRITHUFF,
CORINNE JONES.